(12) United States Patent
Keller et al.

(10) Patent No.: US 7,103,044 B1
(45) Date of Patent: Sep. 5, 2006

(54) UTILIZING AVAILABLE SONET OVERHEAD BYTES FOR ADDITIONAL SIGNALING CHANNELS

(76) Inventors: Richard B. Keller, 13917 SE. 30th St., #C, Vancouver, WA (US) 98983; Claude Denton, 6965 SW. 162nd Pl., Beaverton, OR (US) 97007

( * ) Notice: Subject to any disclaimer, the term of this patent is extended or adjusted under 35 U.S.C. 154(b) by 794 days.

(21) Appl. No.: 09/836,970

(22) Filed: Apr. 17, 2001

(51) Int. Cl.
*H04L 12/56* (2006.01)
*H04J 3/22* (2006.01)

(52) U.S. Cl. ............... 370/392; 370/471; 370/472
(58) Field of Classification Search ........ 370/429, 370/392, 470, 474, 476, 539, 541, 465
See application file for complete search history.

(56) References Cited

U.S. PATENT DOCUMENTS 5,532,862 A * 7/1996 Tada et al. ............... 398/4
5,901,137 A * 5/1999 Nakabayashi ............ 370/222
6,269,081 B1 * 7/2001 Chow et al. ............. 370/241
6,349,092 B1 * 2/2002 Bisson et al. ............ 370/258
6,600,741 B1 * 7/2003 Chrin et al. ............. 370/375

* cited by examiner

*Primary Examiner*—Seema S. Rao
*Assistant Examiner*—Kevin Mew
(74) *Attorney, Agent, or Firm*—Berkeley Law & Technology Group (57) ABSTRACT

An insertion apparatus receives a byte value from a signaling channel, locates a particular unused byte location within an overhead portion of a synchronous optical network (SONET) frame, and inserts the byte value from the signaling channel into the particular unused byte location. An extraction apparatus receives a synchronous optical network (SONET) frame, locates a particular byte location within an overhead portion of the SONET frame that is unused for SONET purposes, and captures a byte value from the particular byte location, wherein the byte value comprises a signaling channel.

18 Claims, 11 Drawing Sheets

UTILIZING AVAILABLE SONET OVERHEAD BYTES FOR ADDITIONAL SIGNALING CHANNELS

FIELD OF THE INVENTION

The present invention pertains to the field of telecommunications. More particularly, this invention relates to utilizing available Synchronous Optical Network (SONET) overhead bytes for additional data channels.

BACKGROUND

Fiber optics have provided a substantial increase in the volume of data that networks can carry. Synchronous Optical Network (SONET) is a standard that defines telecommunication transmissions over fiber optics. SONET defines a number of different data rates for different levels of service. A SONET network can carry from about 52 Mega bits per second to about 10 Gigabits per second over a single optical fiber. In comparison, a typical analog modem operating at maximum efficiency can achieve a mere 56 Kilobits per second. At the 10 Gigabit SONET rate, a single optical fiber can carry enough data to handle well over 100,000 simultaneous voice calls. SONET networks are likely to carry even larger volumes of data in the future.

SONET is generally used as a "trunk" or "backbone" network due to the large volume of data that SONET can handle. That is, most network customers these days do not need 10 Gigabits of bandwidth per second and do not want to pay for unneeded bandwidth. In which case, customers are generally provided with lower data rate services like analog phone lines, Digital Subscriber Lines (DSLs), digital cable lines, Integrated Service Digital Network (ISDN) lines, T1 lines, etc. These lower rate services typically connect customers in a given region to a local "central office." Central offices, in turn, are connected by trunk, or backbone, lines, like SONET lines.

Many smaller data streams from the lower rate services are combined in a SONET line to travel among central offices. A data stream that goes into a SONET line at one central office will be packaged into SONET frames for transmission. At the destination office, the data stream will be recovered, or rebuilt, from the data in the SONET frames.

In addition to the user data, a SONET line is likely to carry a considerable amount of control data. That is, a central office that is packaging a data stream needs to tell the receiving central office various things about the data stream, such as what format the data stream uses and what level of service the data stream uses from potentially many available formats and levels of service.

One approach to communicating control data among central offices is to define an additional control channel to carry the control data. An additional control channel, however, generally uses a certain amount of bandwidth that could otherwise be used to transmit user data. Since users generally pay for transmitting user data and not for transmitting control data, using bandwidth for a control channel tends to reduce revenue.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

The present invention utilizes available overhead bytes in Synchronous Optical Network (SONET) frames to provide additional signaling channels. For instance, the present invention can use overhead bytes to create a control channel to carry control data from one central office to another, freeing up additional bandwidth to carry revenue-generating, user data. In various other embodiments, the present invention can provide additional signaling channels using available overhead bytes for virtually any purpose, such as voice or circuit emulation services, resource provisioning, authentication, billing quality of service parameters, and the like.

Figure 1:
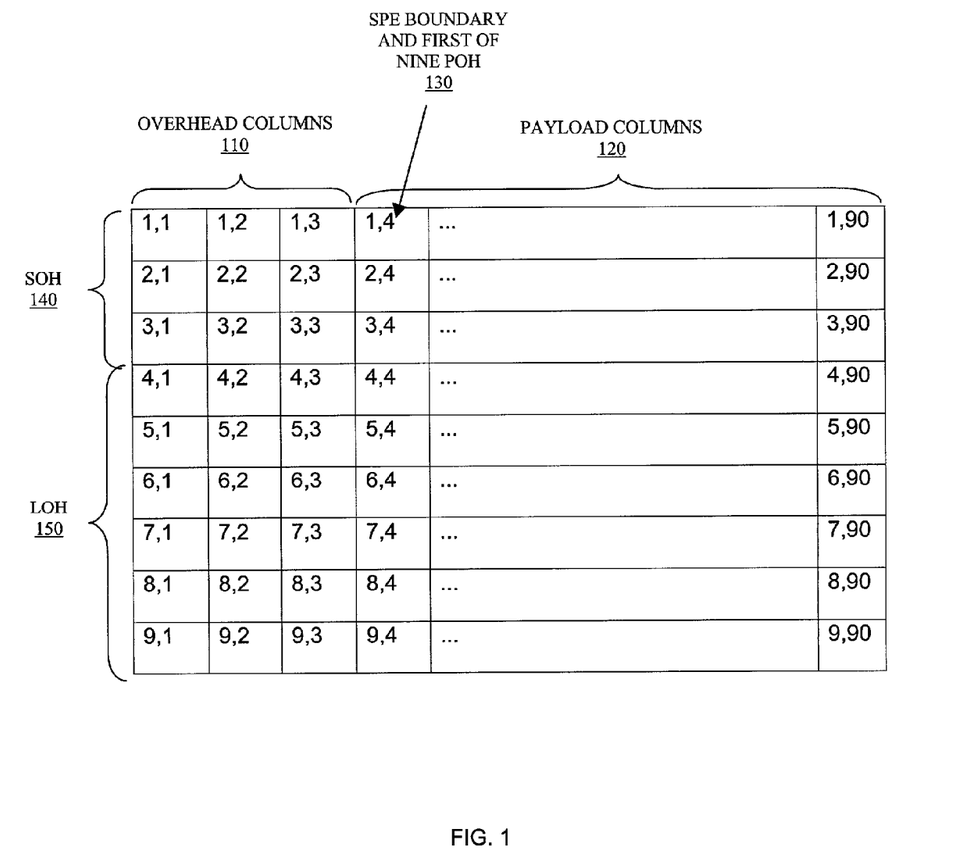
FIG. 1 illustrates one embodiment of a single-plane SONET frame.

FIG. 1 illustrates one embodiment of a single-plane SONET frame. A SONET frame is 9 rows high by 90 rows wide. Each entry in the frame is an 8 bit byte. Transmitting the data in a frame begins at row 1, column 1 and ends at row 9, column 90. Bits of data are transmitted serially, one at a time, as pulses of light in an optical fiber. The frame is read across rows from left to right, one row at a time.

Frames are written in the illustrated format so that overhead bytes and payload bytes are easily identified. Bytes in the first three columns, columns 110, are overhead bytes, and bytes in the remaining columns, columns 120, are payload bytes. When the data is transmitted serially, the first three bytes are overhead, the next 87 bytes are payload, the next three bytes are overhead, the next 87 bytes are payload, and so on.

The first three rows of overhead columns 110 are section overhead (SOH) bytes 140. SOH 140 is used to manage the frame at the lowest level. A frame may go through several hops between a source and a destination. For instance, over a 100 Kilometer trip, a frame may be regenerated every 10 Kilometers or so to ensure sufficient signal strength to make the entire trip. Each hop is called a section. SOH 140 controls regeneration of the frame at each hop.

The next six rows of overhead columns 110 are line overhead (LOH) bytes 150. LOH 150 is used to manage control of the frame at a higher level, as between the SONET device that sent the frame and the SONET device that receives the frame. LOH 150 manages transport of the entire frame payload.

The frame payload includes a Synchronous Payload Envelope (SPE). In the illustrated embodiment, the SPE occupies the entire payload of the frame, rows 1 through 9, columns 4 through 90. In other words, the SPE occupies 783 of the total 810 bytes. The illustrated SPE is "aligned" with the frame in that the SPE boundary 130 is at row 1, column 4. In alternate embodiments, an SPE may not be aligned due, for instance, to timing variations in the network. That is, an SPE may span two SONET frames so that the boundary between two SPEs is located at some arbitrary position in the payload section of the frame. The LOH 150 includes a pointer (not shown) to the location of the boundary between the SPEs. In the illustrated embodiment, since the SPE is aligned with the frame, the pointer in the LOH points to the SPE boundary 130 in row 1, column 4.

The 9 bytes of the SPE in column 4 are path overhead (POH) bytes. POH manages the frame at yet a higher level where, for instance, separate bit streams from many end users are combined into the SPE at the source and broken out from the SPE at the destination. In alternate embodiments in which the SPE is not aligned with the frame, the 9 POH bytes will be in the same column as the SPE boundary. As with the SPE itself, the 9 POH bytes may span two frames. In which case, each frame will include 9 POH bytes, but the POH bytes may be divided between two SPEs.

Figure 2:
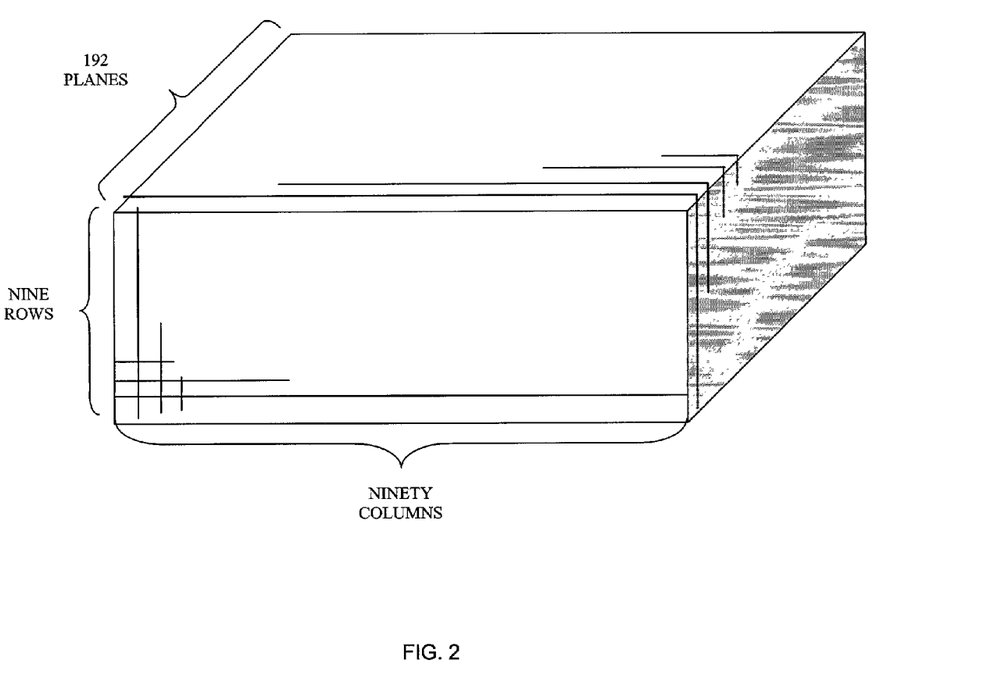
FIG. 2 illustrates one embodiment of a composite SONET frame having 192 planes.

FIG. 2 illustrates one embodiment of a composite SONET frame. The composite frame is comprised of multiple planes identical to the single-plane frame illustrated in FIG. 1. That is, each plane in the composite frame includes 9 rows and 90 columns, with 9 bytes of SOH, 18 bytes of LOH, and 9 bytes of POH. The number of planes in a composite frame depends on the data rate level at which the SONET network is operating. In the illustrated embodiment, there are 192 planes in the frame.

The composite frame of FIG. 2, like the single-plane frame of FIG. 1, is a single unit in the network. That is, no matter how many planes a frame has, one frame is transmitted every 125 micro seconds, or 8000 times per second.

By increasing the size of a frame by adding more planes, the data rate increases. For instance, the data rate for the single-plane frame of FIG. 1 is 810 bytes per frame times 8 bits per byte times 8000 frames per second, which equals 51.84 Mega bits per second. For the 192-plane frame of FIG. 2, the data rate is 810 bytes per plane times 192 planes per frame times 8 bits per byte times 8000 frames per second, which equals 9.95328 Gigabits per second.

Since a frame is a single unit, transmitting a frame can be managed for the most part by using one set of overhead bytes. That is, the SOH, LOH, and POH bytes from the first plane of a multi-plane frame are used during transmission, but many of the equivalent bytes in other planes of the frame are essentially ignored. For a 192 plane frame such as the one illustrated in FIG. 2, unused overhead accounts for more than 320 Mega bits per second of unused bandwidth. In other words, the equivalent of more than 48,000 planes out of 1,536,000 planes are essentially wasted every second.

Figure 3:
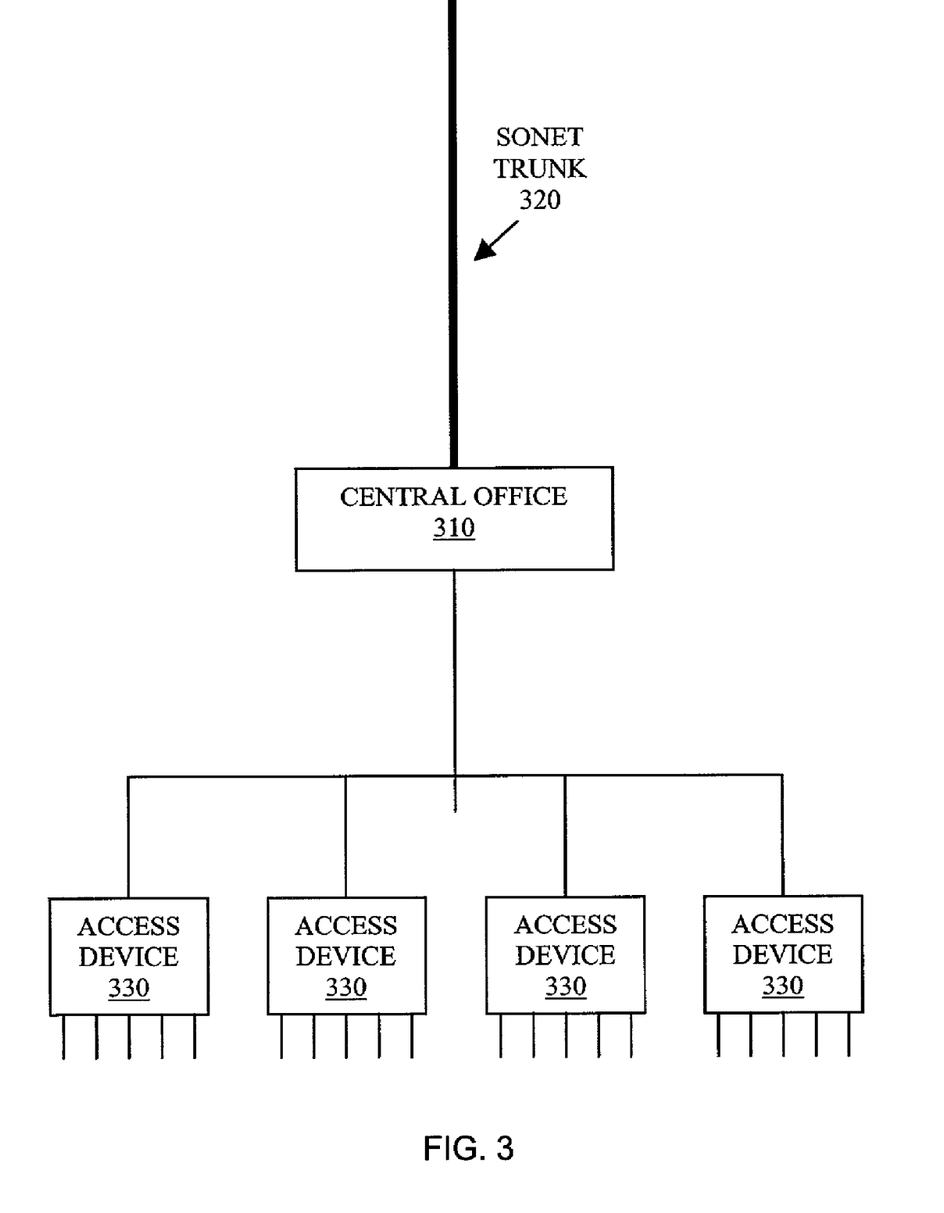
FIG. 3 illustrates a central office in which one embodiment of the present invention can be used.

FIG. 3 illustrates one embodiment of a central office 310 in which the present invention can be used to insert channels of data into unused SONET overhead. The central office 310 is coupled to a SONET trunk line 320 and a number of regional access devices 330. The central office 310 is path terminating equipment, meaning it is located at the end of a SONET path.

The trunk line 320 can carry a great deal more data than any of the access devices 330. Data traffic from one or more of the access devices that is destined for a different region serviced by a different central office (not shown) is combined, or multiplexed, into the payloads of SONET frames and transmitted over the SONET trunk line 320 by central office 310. Conversely, data traffic from a different region serviced by a different central office (not shown) that is destined for a user coupled to one of the regional access devices 330 is separated out, or demultiplexed, by the central office 310 from the payloads of SONET frames received over the trunk line 320. Path overhead (POH) is used to manage the multiplexing and demultiplexing of payloads. Except for the teachings of the present invention, central office 310 is intended to represent a wide variety of path terminating equipment known in the art.

Figure 4:
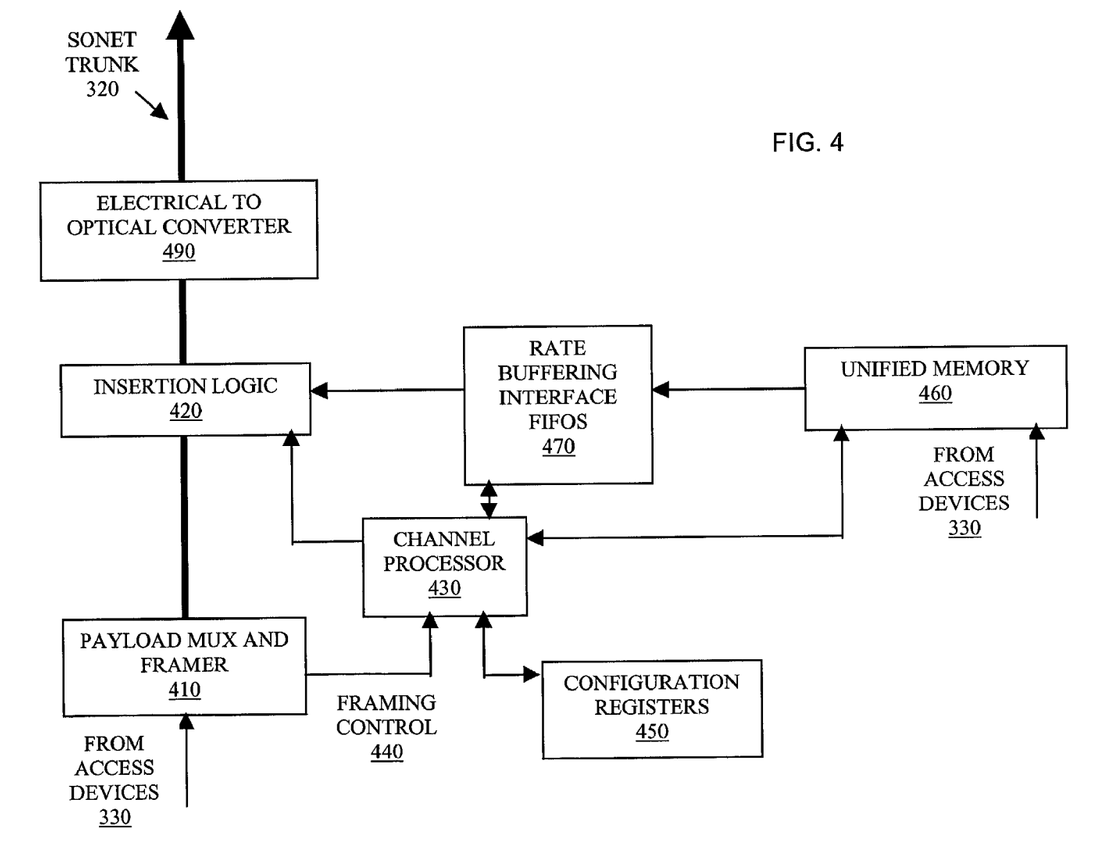
FIG. 4 illustrates one embodiment of the present invention for inserting data into unused byte locations.

FIG. 4 illustrates one embodiment of the present invention for inserting a data channel into unused overhead bytes of a SONET data stream. The illustrated embodiment is described as part of the central office 310 of FIG. 3. Alternate embodiments may be used with any number of SONET devices, such as regenerators, line terminating equipment, and the like.

In the illustrated embodiment, the insertion apparatus overlays a standard SONET framing process. That is, payload multiplexer 410 receives data streams from access devices 330 and multiplexes them into frames in an electrical format. If not for the present invention, the electrically formatted frames would be provided unchanged to electrical to optical converter 490. Electrical to optical converter 490 converts the electrical bits comprising the frame into equivalent optical pulses.

The present invention, however, modifies the electrically formatted frames by inserting one or more additional channels of data, or signaling channels, before the frames are converted to optical format. In general, the locations of available bytes in each frame are known, so bytes comprising an additional signaling channel can be inserted into the data stream at the known locations. In practice however, the speed at which SONET operates can create some challenges.

For instance, section and line overhead (SOH and LOH) bytes are disbursed in sets of three bytes separated by sets of 87 bytes. A frame having 192 planes includes almost 175,000 bytes. Each frame is transmitted once every 125 microseconds, so a set of three bytes streams by in about 2 nanoseconds. To insert one or two bytes from one data stream into another data stream in just a couple of nanoseconds, the insertion apparatus must multiplex, or switch, between the two data streams and at precisely the right instant in time.

A processor, however, is generally not the best choice for time critical operations. That is, processors tend to stall from time to time when executing software. A processor that is sufficiently reliable and fast enough to multiplex data channels into available overhead bytes as the bytes stream by could be prohibitively expensive.

On the other hand, a purely hardware solution is likely to be much less expensive, but also much less flexible. Programming a processor to insert a data channel into frames provides a great deal of flexibility. Depending of the type of data that is being transmitted, the number of data channels needed, etc., a processor can be programmed to generate a variety of different data channels having a variety of different data rates.

The illustrated embodiment uses a combined hardware/software approach that is both programmable and comparatively inexpensive. Rather than using a processor to perform the high speed, real-time multiplexing of the data streams, the illustrated embodiment uses a hardware multiplexer (not shown) in insertion logic 420. The insertion logic reads data from the rate buffering interface FIFOs (First-In-First-Outs) 470 and multiplexes the data into appropriate available overhead byte locations.

In a configuration mode, channel processor 430 is used to program the unified memory 460, insertion logic 420, and the FIFOs 470 to insert various data channels. In operation, the channel processor 430 also loads data from the unified memory 460 into the FIFOs 470. The processor cycles through the data channels, loading FIFOs corresponding to particular data channels in bursts. Writing a burst of data for a particular channel to a FIFO all at once greatly reduces the frequency at which the processor has to switch channels. This slower switching speed allows for a comparatively slower, and therefore comparatively inexpensive, processor.

The buffers also provide a margin of error for the processor. That is, the buffers are designed to hold enough bytes of data to last until the next time the processor is expected to service a particular buffer. The duration during which the data is expected to last in a buffer may be long enough to accommodate typical processor delays. Even accounting for some processor delays, a buffer may underflow, or run out of data if the processor is delayed for an exceptionally long time. Various embodiments of buffers treat underflow conditions in different ways. For instance, a buffer may repeat a last value, may wrap around to the oldest value, may send all zeros, all ones, or some predefined bit pattern.

Although the present invention is described in terms of a combined hardware/software solution, alternate embodiments of the present invention may use entirely hardware or entirely software approaches, for instance, as technology improves to provide faster, more reliable, less expensive processors, or larger, more versatile, more compact application specific integrated circuits (ASICs), programmable gate arrays (PGAs), etc.

In the illustrated embodiment, the channel processor 430 reads configuration registers 450 to program the insertion apparatus. Configuration registers define the number of channels and the row, column, and plane locations for each byte of each channel in each frame. The channel processor 430 defines regions of unified memory 460 to store data from the access devices 330 for each defined channel. The channel processor 430 also assigns FIFOs 470 for each byte location of each channel in each frame. The channel processor 430 also configures the insertion logic with the byte location(s) in each frame corresponding to each data channel.

In operation, the insertion logic identifies byte locations in a given frame corresponding to particular channels, reads bytes from the FIFOs corresponding to the channels, and inserts the bytes in the identified byte locations. Simultaneously, the channel processor 430 cycles through the FIFOs 470 and loads them in burst operations with data from respective regions of the unified memory.

Figure 5:
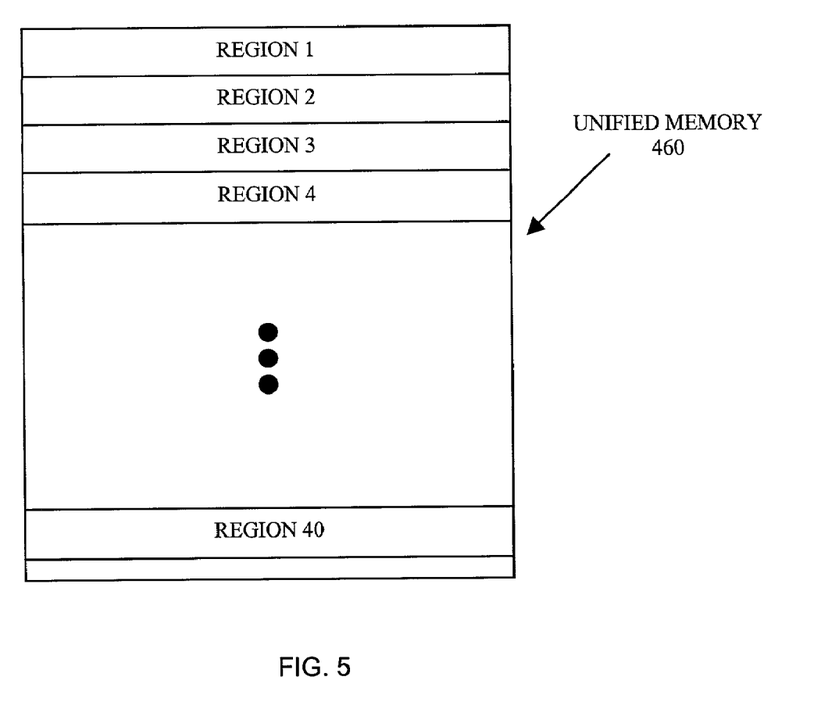
FIG. 5 illustrates one embodiment of a unified memory.

FIG. 5 illustrates one embodiment of unified memory 460. The memory is divided into regions corresponding to different data channels. For instance, data comprising a control channel associated with a particular type and level of service provided to a particular network user may be stored in a single region. The data can be stored, for instance, by channel processor 430 or by direct memory access (DMA) controllers. In the illustrated embodiment, the unified memory contains regions defining 40 separate channels to be inserted into available overhead byte locations. In alternate embodiments, the unified memory 460 can be configured to define more signaling channels or fewer signaling channels.

Figure 6:
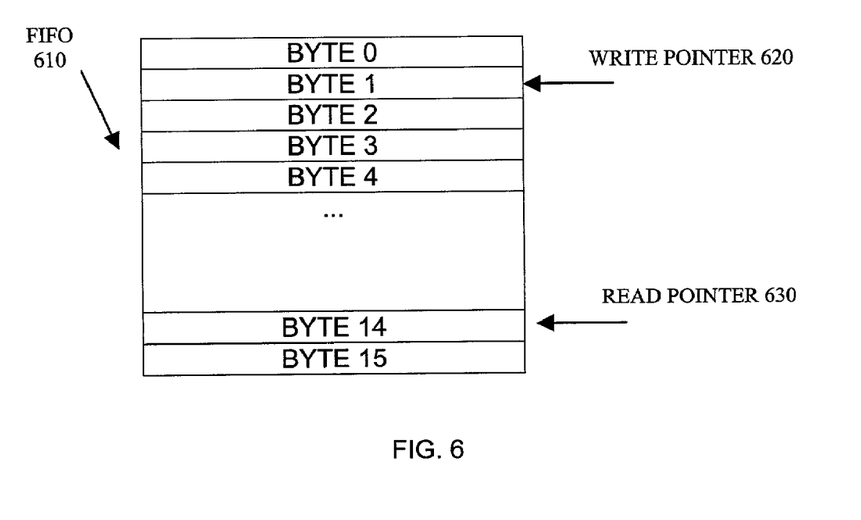
FIG. 6 illustrates one embodiment of a FIFO.

FIG. 6 illustrates one embodiment of a FIFO 610 that may be used in FIFOs 470. FIFO 610 includes 16 single byte storage locations. Each byte corresponds to a different frame. That is, each byte will be written to a different frame. If a byte is read from the FIFO and inserted in every frame, since frames are sent once every 125 microseconds and the FIFO stores 16 bytes, the FIFO can buffer enough data to last for 2 milliseconds. In which case, to avoid an underflow condition, the processor must cycle through the FIFOs and return to FIFO 610 in less than 2 milliseconds to re-load the FIFO before it runs out of data. The channel processor 430 writes to the byte location indicated by the write pointer 620 and the insertion logic reads from the byte location indicated by the read pointer 630. An underflow condition occurs when the read pointer 630 equals the write pointer 620. As discussed above, various embodiments of buffers may treat underflow conditions differently.

Figure 7:
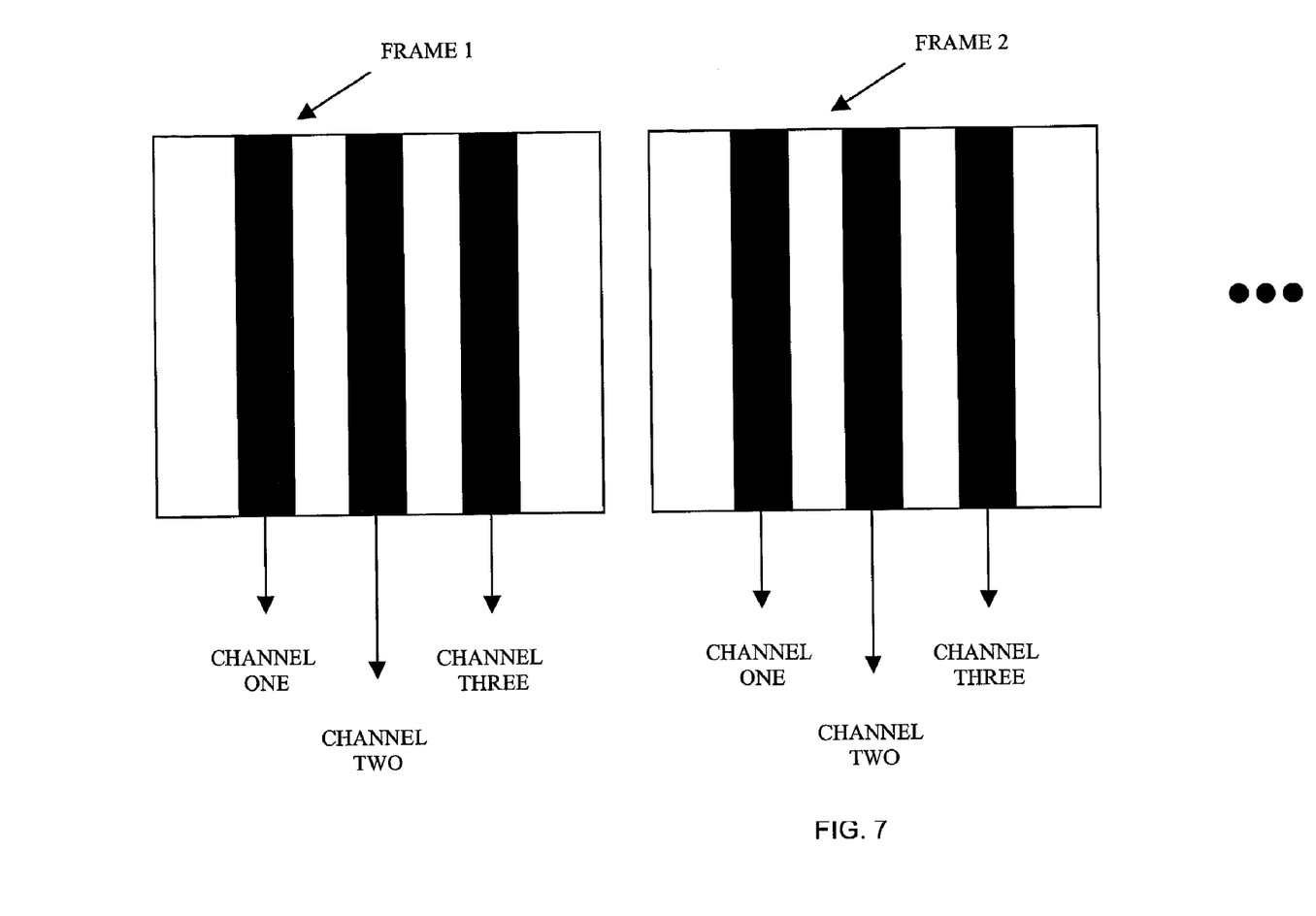
FIG. 7 illustrates one embodiment of a static two dimensional storage pattern for bytes stored in unused byte locations.

FIG. 7 illustrates one embodiment of "static" insertion. That is, once the insertion apparatus is programmed, the insertion apparatus inserts signaling channels into each frame in exactly the same pattern. Each byte of an inserted signaling channel is assigned a particular row, column, and plane, and each byte is inserted in the same row, column, and plane in each frame. In the illustrated embodiment, data for three channels are stored in identical, static patterns in each frame.

The locations at which data is located can be determined with respect to the start of a frame, as for data inserted in the section or line overhead (SOH or LOH) columns of a frame, or with respect to the boundary location of a synchronous payload envelope (SPE) within a frame, as for data inserted in the path overhead (POH) byte locations of a frame. In the case of POH insertion, an SPE boundary location can be identified by a pointer located in the LOH overhead. As shown in FIG. 4, the channel processor receives framing control data 440 that includes the value of the SPE pointer with which the processor can program the insertion logic. In alternate embodiments, the value of the SPE pointer may change over time. In which case, the channel processor may dynamically configure insertion logic 420 with the new value, or insertion logic 420 may include hardware to automatically read the pointer values for each frame. In alternate embodiments, additional aspects of the inserted data patterns can be dynamically adjusted to, for instance, add channels, remove channels, change the amount of bandwidth assigned to a particular channel, etc. Alternate embodiments may also include a channel pattern that repeats over the course of several frames, for instance, where a given channel only inserts bytes once every N frames.

Figure 8:
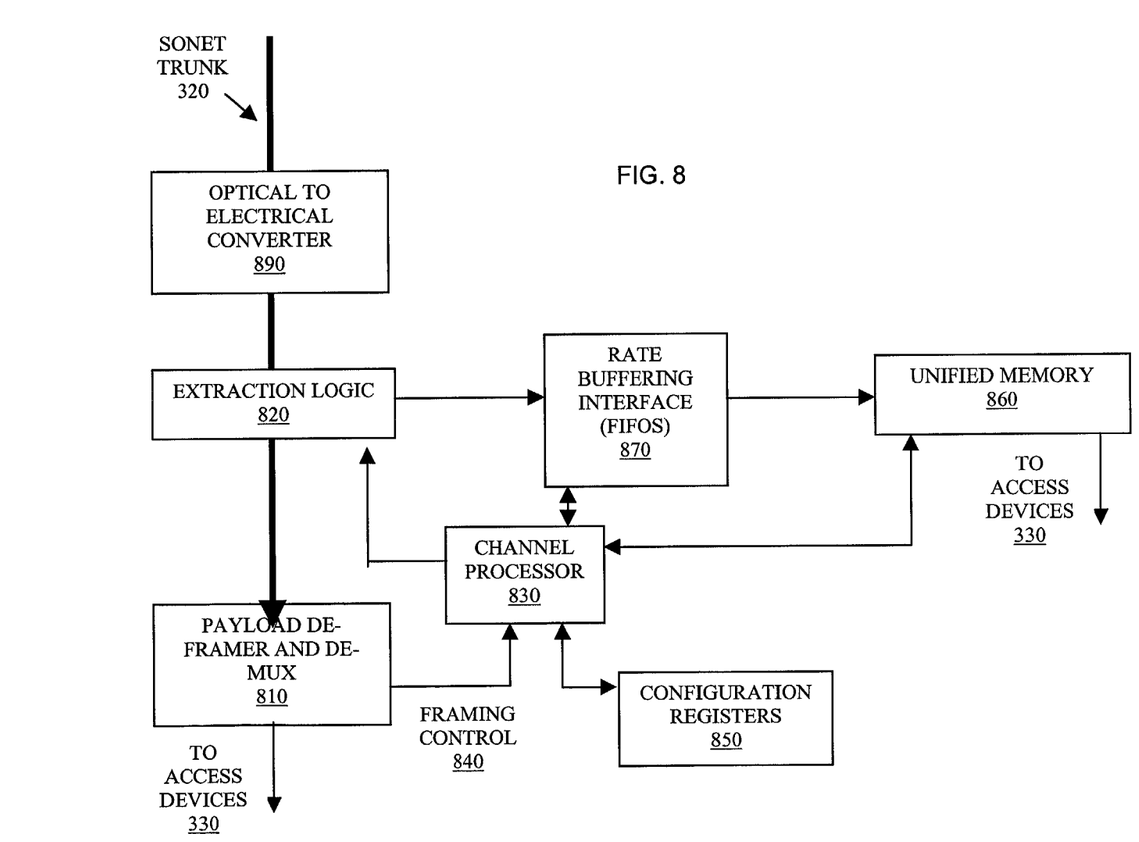
FIG. 8 illustrates one embodiment of the present invention for extracting data from unused byte locations.

FIG. 8 illustrates one embodiment of the present invention for extracting data that has been inserted in the available overhead bytes. The extraction apparatus operates in complement to the insertion apparatus. The extraction apparatus is configured based on the configuration registers 850 and framing control 840 much like the insertion apparatus. In operation, the optical signals are converted to electrical signals by converter 890. The extraction logic 820 identifies the row, column, and plane for each byte inserted in unused overhead and writes the identified byte values to respective rate buffering interface FIFOs 870. The processor 830 services the FIFOs in cycles to write the data channels to corresponding regions in unified memory 860. From the unified memory, the data channels are provided to access devices 330.

Instead of underflow conditions, processor delays in the extraction apparatus will result in overflow conditions. Various embodiments of FIFOs can handle overflows in different ways. For instance, a FIFO may drop new data or wrap around and overwrite the oldest data.

Figure 9:
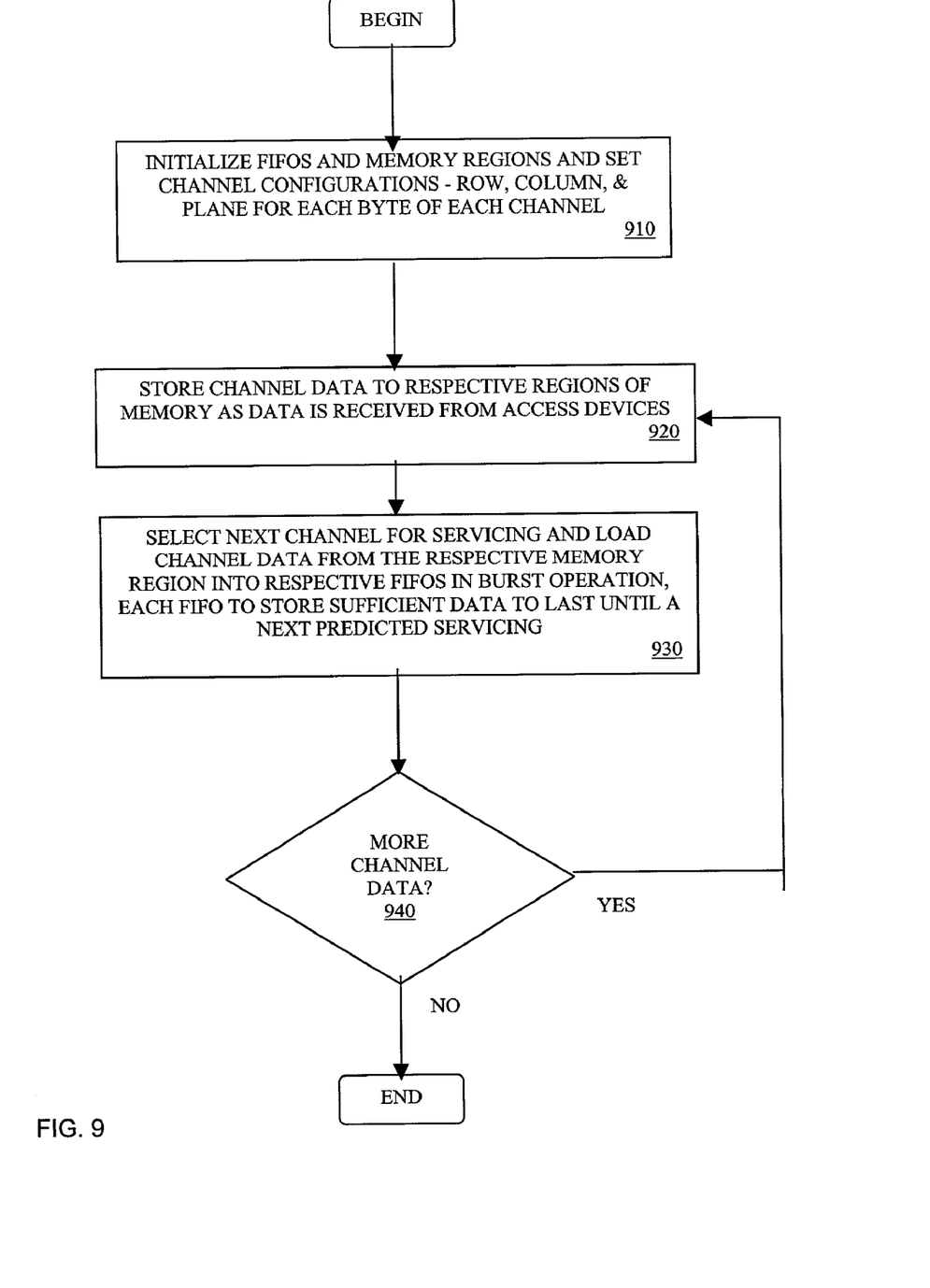
FIG. 9 demonstrates one embodiment of the present invention for loading interface buffers from a unified memory.
Figure 10:
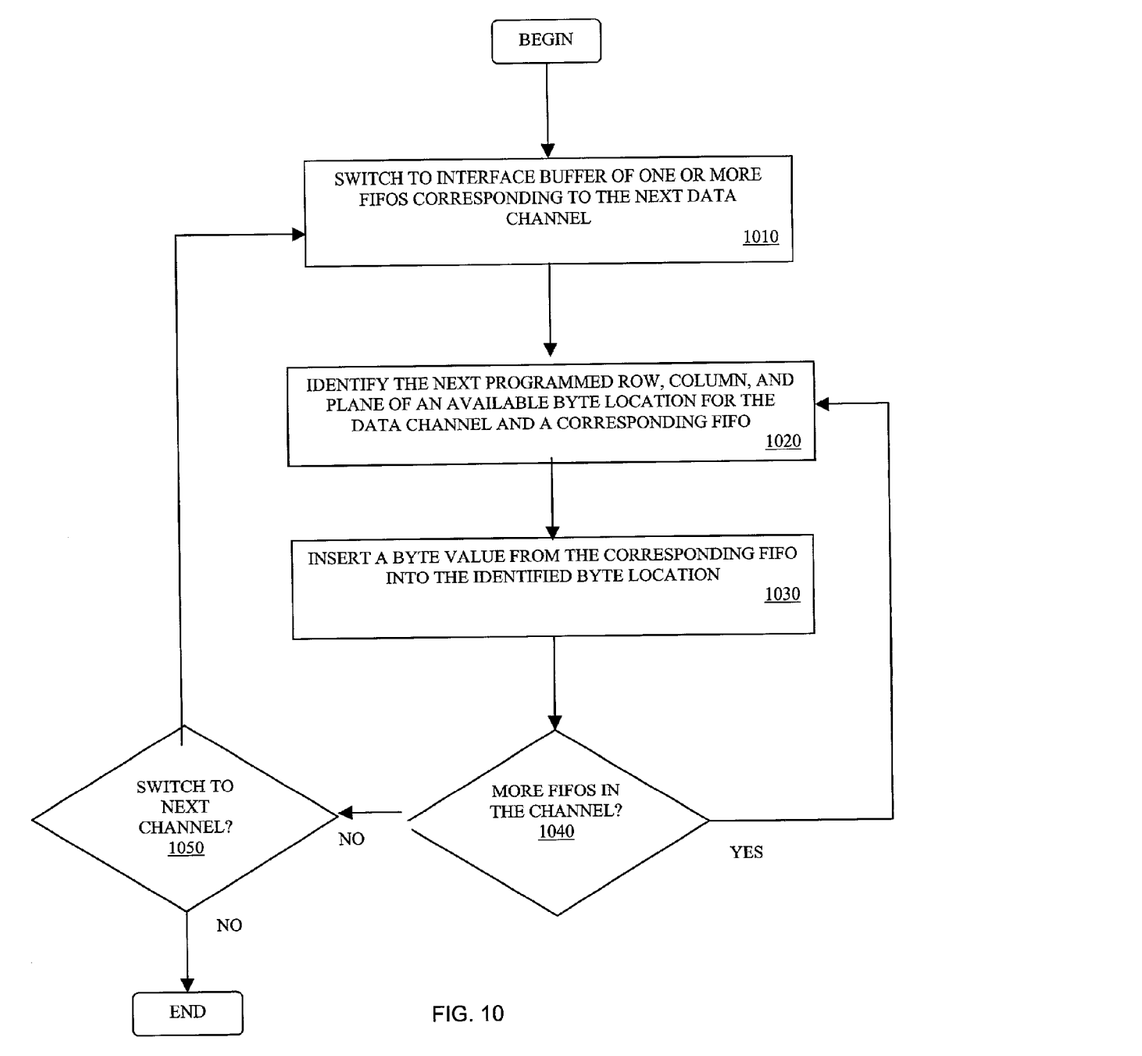
FIG. 10 demonstrates one embodiment of the present invention for inserting bytes from interface buffers into unused byte locations.

FIGS. 9 and 10 demonstrate one embodiment of the simultaneous hardware and software processes performed by one embodiment of the present invention for inserting data. Similar complementary processes can be used to extract data. In general, the present invention receives bytes comprising a signaling channel, locates particular unused byte locations within an overhead portion of a SONET frame, and inserts the bytes into the particular locations. The illustrated embodiment includes a number of implementation specific details. Alternate embodiments may not include all of the illustrated elements, may include additional elements, and may perform one or more elements in different orders.

In FIG. 9, one embodiment of the software portion of an insertion apparatus is demonstrated. The insertion apparatus is initialized at block 910. Initialization may include clearing regions of the unified memory and the FIFO interface buffers. Initialization may also include programming the insertion apparatus to accommodate a particular number of signaling channels. In the illustrated embodiment, each signaling channel is assigned a particular row, column, and plane location that is the same for each frame, or over a set of frames. In alternate embodiments, a channel may be assigned multiple byte locations in each frame, or the byte locations may change over time.

In block 920, the channel processor stores channel data to respective regions of the unified memory as data is received from various access devices. In alternate embodiments, the unified memory may be loaded, for instance, through the use of direct memory access (DMA) controllers.

In block 930, the processor selects a channel for servicing. The selected channel is serviced by reading data from a corresponding region in the unified memory and loading the data into a corresponding FIFO in a burst operation. The selection can be made based on a service cycle schedule. Depending on the data rates of the respective data channels, and depending on the size of each FIFO, a service cycle may service in a variety of ways. For instance, where all the channels have the same data rate and all the FIFOs are the same size, all channels will generally be serviced equally often. For channels having different data rates and/or FIFO sizes, some channels may be serviced more often than others. For example, one channel's data rate may require that a byte be inserted in every third frame, and another channel may require that a byte be inserted in every frame. If both channels have equally sized FIFOs, the second channel should be serviced three times for every one time the first channel is serviced.

In block 940, if the insertion apparatus is to continue inserting channel data, the process returns to store more data, select a channel for servicing, and load the respective FIFO. If no more data is to be inserted, the process stops.

FIG. 10 demonstrates one embodiment of the hardware portion of an insertion apparatus. In block 1010, the insertion logic switches to an interface buffer comprising one or more FIFOs corresponding to the next signaling channel. The insertion logic cycles through the FIFOs much like the processor does, only at a much faster rate. As with the processor, the sequence of switching among FIFOs may depend on the data rate associated with the respective channels. A faster channel will be selected more often than a slower channel. Where all of the channels are equally fast, all of the channels will be selected equally often.

In block 1020, the insertion logic identifies the next row, column, and plane having an available byte location to which the insertion logic has been programmed to write. Identifying the byte location may involve counting byte locations from the beginning of a frame, or counting rows, columns, and planes from the beginning of a frame, for data to be inserted in the section or line overhead (SOH or LOH). For data to be inserted in the path overhead (POH), the insertion logic inserts the data with respect to the position of the SPE boundary. The insertion logic may be programmed with the location of the SPE boundary or may identify the SPE boundary from a pointer in the LOH.

In block 1030, the insertion logic inserts the byte of data in the identified byte location. In block 1040, if there are multiple FIFOs in a channel, the insert logic returns to the next FIFO in block 1020. If there are no more bytes to be inserted for the current channel in block 1040, the process checks to see if it is to continue with the next channel. If so, the process returns to block 1010. If the process is not to continue, the process ends.

In alternate embodiments, rather than inserting the present invention between conventional SONET components, the present invention is incorporated into conventional SONET components. For instance, rather than inserting bytes of data after the SONET frames have been formed, as illustrated in FIG. 4 between elements 410 and 490, an alternate embodiment incorporates the functionality of the present invention into the framing process itself, as in element 410 of FIG. 4. That is, as one or more data streams are framed or multiplexed into the payloads of SONET frames, the present invention can be used to similarly insert or multiplex additional signaling channels into the unused overhead of the SONET frames. Conversely, as one or more data streams are deframed or demultiplexed from the payloads of SONET frames, the present invention can be used to similarly extract or demultiplex additional signaling channels from the unused overhead of the SONET frames.

Figure 11:
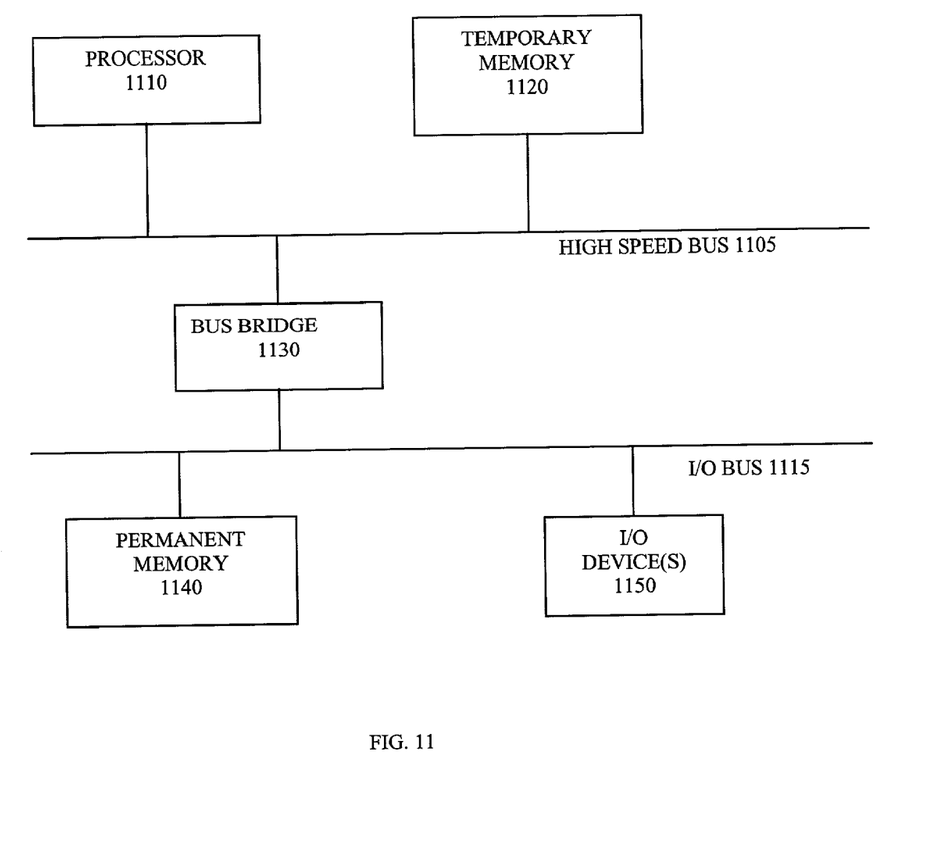
FIG. 11 illustrates one embodiment of a hardware system.

FIG. 11 illustrates one embodiment of a hardware system intended to represent a broad category of computer systems such as personal computers, workstations, and/or embedded systems. In the illustrated embodiment, the hardware system includes processor 1110 coupled to high speed bus 1105, which is coupled to input/output (I/O) bus 1115 through bus bridge 1130. Temporary memory 1120 is coupled to bus 1105. Permanent memory 1140 is coupled to bus 1115. I/O device(s) 1150 is also coupled to bus 1115. I/O device(s) 1150 may include a display device, a keyboard, one or more external network interfaces, etc.

Certain embodiments may include additional components, may not require all of the above components, or may combine one or more components. For instance, temporary memory 1120 may be on-chip with processor 1110. Alternately, permanent memory 1140 may be eliminated and temporary memory 1120 may be replaced with an electrically erasable programmable read only memory (EE-PROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system of FIG. 11. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 1140.

Figure 12:
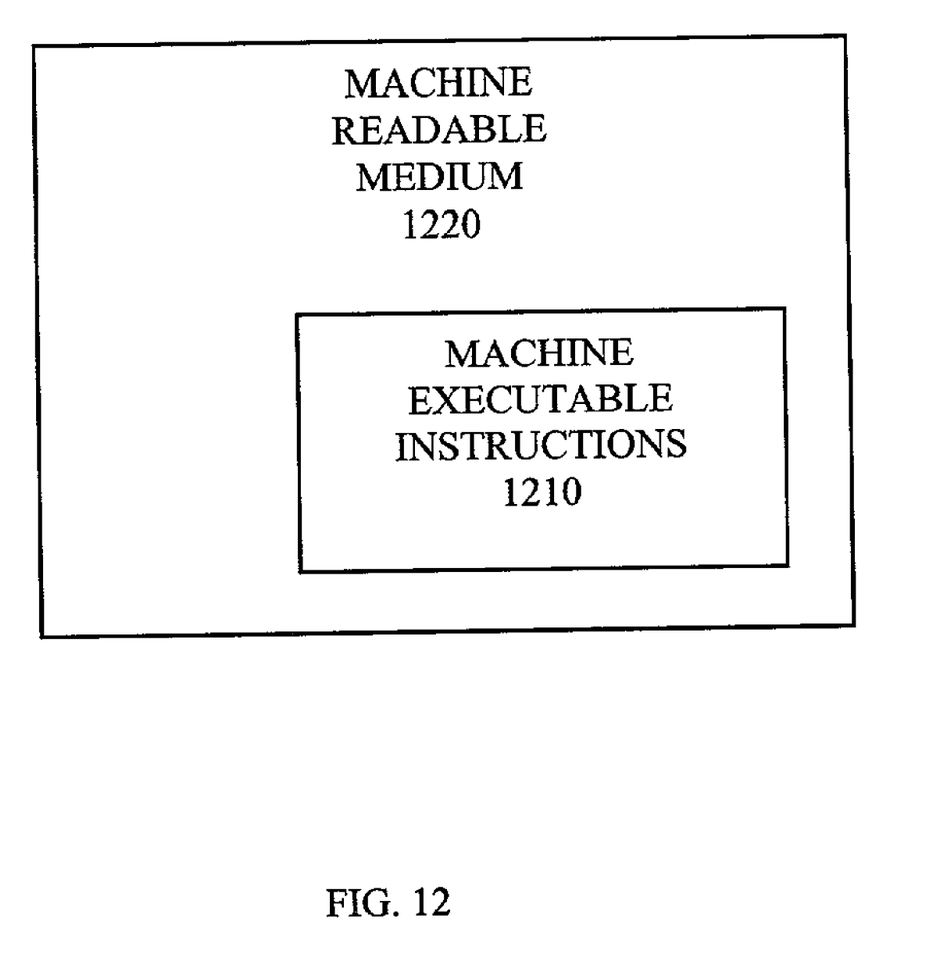
FIG. 12 illustrates one embodiment of a machine readable storage medium.

Alternately, as shown in FIG. 12, the software routines can be machine executable instructions 1210 stored using any machine readable storage medium 1220, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 1150 of FIG. 11.

From whatever source, the instructions may be copied from the storage device into temporary memory 1120 and then accessed and executed by processor 1110. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a method and apparatus for utilizing available SONET overhead bytes for additional signaling channels is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method comprising:
   receiving a byte value from a signaling channel;
   locating a particular unused byte location within an overhead portion of a synchronous optical network (SONET) frame, wherein locating the particular unused byte location comprises:
      switching to an interface buffer storing the byte value when the particular unused byte location is available to be written, said interface buffer being one of a plurality of interface buffers corresponding to a plurality of signaling channels, said plurality of interface buffers being switched to match the plurality of signaling channels to corresponding byte locations at a data rate of a SONET service comprising the SONET frame; and
      inserting the byte value from the signaling channel into the particular unused byte location.

2. The method of claim 1 wherein the signaling channel comprises a control channel to define at least one of quality of service, authentication, provisioning, and billing parameters for one or more regional network services trunked to a SONET service comprising the SONET frame.

3. The method of claim 1 further comprising:
   receiving a plurality of additional byte values from the signaling channel;
   locating a plurality of additional unused byte locations within the overhead portion of the SONET frame; and
   inserting the plurality of additional byte values into respective ones of the plurality of additional unused byte locations.

4. The method of claim 1 further comprising:
   receiving a plurality of additional byte values from a plurality of additional signaling channels;
   locating a plurality of additional unused byte locations within the overhead portion of the SONET frame; and
   inserting the plurality of additional byte values from the plurality of additional signaling channels into respective ones of the plurality of additional unused byte locations.

5. The method of claim 1 further comprising:
   receiving a plurality of additional byte values from the signaling channel;
   locating the particular unused byte location within the overhead portion of a plurality of additional SONET frames; and
   inserting the plurality of additional byte values from the signaling channel into the particular unused byte location in respective ones of the plurality of additional SONET frames.

6. The method of claim 1 wherein locating the particular unused byte location is one of a static location procedure and a dynamic location procedure.

7. The method of claim 1 wherein locating the particular unused byte location is programmable.

8. The method of claim 1 receiving the byte value comprises:
   storing the byte value in one of a plurality of regions of a unified memory, each of the plurality of regions corresponding to one of a plurality of signaling channels including the signaling channel of the byte value; and loading the byte value from the respective region of the unified memory into an interface buffer corresponding to the respective region as part of a burst operation in which a plurality of additional byte values from the respective region are also loaded in the interface buffer, said interface buffer being one of a plurality of interface buffers corresponding to the plurality of regions, each of the plurality of interface buffers being loaded by the burst operation in a cyclical manner from respective regions of the unified memory.

9. The method of claim 1 wherein locating the particular unused byte location further comprises:
identifying a particular row, column, and plane in the SONET frame.

10. The method of claim 9 wherein identifying the particular row, column, and plane is with respect to one of a boundary of the SONET frame and a boundary of a synchronous payload envelope (SPE) within the SONET frame.

11. The method of claim 1 wherein the unused byte location comprises a byte location in one of a section overhead portion of the SONET frame, a line overhead portion of the SONET frame, and a path overhead portion of a synchronous payload envelope (SPE) within the SONET frame.

12. A method comprising:
receiving a synchronous optical network (SONET) frame;
locating a particular byte location within an overhead portion of the SONET frame that is unused for SONET purposes, wherein locating the particular byte location comprises switching to an interface buffer storing the byte value when the particular byte location is available to be written, said interface buffer being one of a plurality of interface buffers corresponding to a plurality of signaling channels, said plurality of interface buffers being switched to match the plurality of signaling channels to corresponding byte locations at a data rate of a SONET service comprising the SONET frame; and
capturing a byte value from the particular byte location, said byte value comprising a signaling channel.

13. A machine accessible medium having stored thereon machine executable instructions that when executed implement a method comprising:
receiving a byte value from a signaling channel;
locating a particular unused byte location within an overhead portion of a synchronous optical network (SONET) frame, wherein locating the particular unused byte location comprises switching to an interface buffer storing the byte value when the particular unused byte location is available to be written, said interface buffer being one of a plurality of interface buffers corresponding to a plurality of signaling channels, said plurality of interface buffers being switched to match the plurality of signaling channels to corresponding byte locations at a data rate of a SONET service comprising the SONET frame; and
inserting the byte value from the signaling channel into the particular unused byte location.

14. An article of manufacture comprising a machine accessible medium having stored thereon machine executable instructions that if executed result in:
receiving a synchronous optical network (SONET) frame;
locating a particular byte location within an overhead portion of the SONET frame that is unused for SONET purposes, wherein locating the particular byte location comprises switching to an interface buffer storing the byte value when the particular byte location is available to be written, said interface buffer being one of a plurality of interface buffers corresponding to a plurality of signaling channels, said plurality of interface buffers being switched to match the plurality of signaling channels to corresponding byte locations a data rate of a SONET service comprising the SONET frame; and
capturing a byte value from the particular byte location, said byte value comprising a signaling channel.

15. An apparatus comprising:
insertion logic to receive a byte value from a signaling channel, locate a particular unused byte location within an overhead portion of a synchronous optical network (SONET) frame, and insert the byte value from the signaling channel into the particular unused byte location, wherein locating the particular unused byte location comprises switching to an interface buffer storing the byte value when the particular unused byte location is available to be written, said interface buffer being one of a plurality of interface buffers corresponding to a plurality of signaling channels, said plurality of interface buffers being switched to match the plurality of signaling channels to corresponding byte locations at a data rate of a SONET service comprising the SONET frame.

16. The apparatus of claim 15 further comprising:
a unified memory to store the byte value in one of a plurality of regions within the unified memory, each of the plurality of regions corresponding to one of a plurality of signaling channels including the signaling channel of the byte value; and
an interface buffer to couple the unified memory to the insertion logic, said interface buffer to be loaded with the byte value from the respective region of the unified memory.

17. The apparatus of claim 16 wherein the interface buffer is loaded as part of a burst operation in which a plurality of additional byte values from the respective region are also loaded into the interface buffer, said interface buffer being one of a plurality of interface buffers corresponding to the plurality of regions within the unified memory, each of the plurality of interface buffers being loaded by the burst operation in a cyclical manner from respective regions of the unified memory.

18. An apparatus comprising:
extraction logic to receive a synchronous optical network (SONET) frame, locate a particular byte location within an overhead portion of the SONET frame that is unused for SONET purposes, and capture a byte value from the particular byte location, said byte value comprising a signaling channel, wherein locating the particular byte location comprises switching to an interface buffer storing the byte value when the particular byte location is available to be written, said interface buffer being one of a plurality of interface buffers corresponding to a plurality of signaling channels to corresponding byte locations at a data rate of a SONET service comprising the SONET frame.

* * * * *